United States Patent [19]
Begat

[11] 3,874,252
[45] Apr. 1, 1975

[54] GEARBOX

[76] Inventor: Vincent Begat, Essingestraket 32, Stockholm, Sweden 11266

[22] Filed: Mar. 12, 1973

[21] Appl. No.: 340,033

[52] U.S. Cl.......................... 74/802, 74/687, 74/789
[51] Int. Cl............................................... F16h 1/28
[58] Field of Search ............ 74/740, 741, 792, 789, 74/750 R, 752 C, 761, 783, 802, 753, 687

[56] References Cited
UNITED STATES PATENTS
1,644,614  10/1927  Sanderson.............................. 74/790
2,498,797   2/1950  Duffield............................ 74/792 X FOREIGN PATENTS OR APPLICATIONS
624,374   6/1949   United Kingdom............... 74/792

Primary Examiner—Samuel Scott
Assistant Examiner—Frank H. McKenzie, Jr.
Attorney, Agent, or Firm—Holman & Stern

[57] ABSTRACT

A gearbox having a gearshifting unit including a sun wheel mounted on an output shaft. A pair of clutches are connected to an input shaft, and to the sun wheel by associated forward and reverse planet gears. Forward, reverse, and direct-drive mode are obtainable by selective engagement of the clutch.

7 Claims, 2 Drawing Figures

GEARBOX

BACKGROUND OF THE INVENTION

This invention relates to a gearbox, which comprises an input shaft, an output shaft and a gear shifting unit therebetween.

SUMMARY OF THE INVENTION

The invention has as its object to produce a gearbox, which is particularly adapted for use as supplementary gearbox in heavy vehicles, but also other applications can be imagined. A further object of the invention is to bring about a gearbox in combination with a clutch, which replaces the usual clutch means of the vehicle.

These and other objects of the invention are achieved by the characterizing features of the invention as they are defined in the claims.

BRIEF DESCRIPTION OF THE DRAWINGS

The invention is described in the following, with reference to the drawings, in which.

DESCRIPTION OF THE PREFERRED EMBODIMENTS

Figure 1:
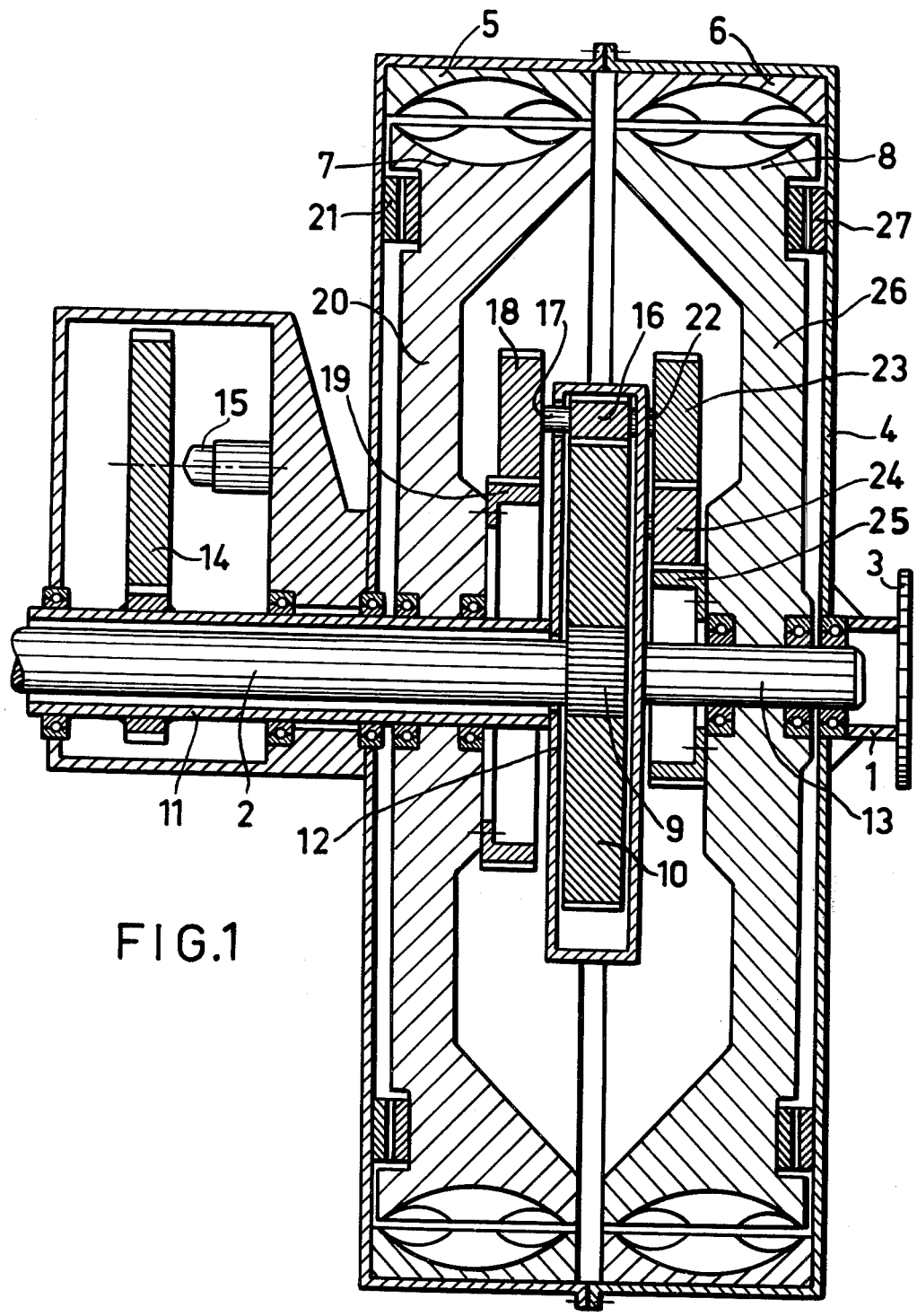
FIG. 1 shows a section through a first embodiment of the gearbox according to the invention.

FIG. 1 shows as mentioned a vertical section through a first embodiment of the gearbox comprising an input shaft 1 and an output shaft 2. The input shaft 1 is tubular and provided with a flange 3 for coupling to a driving unit, for example a motor or the like. A casing 4 is mounted on the input shaft 1 and rotates with the speed of the input shaft. Said casing 4 supports on the inside at the outer end two pump wheels 5,6, which coact with two turbine wheels 7,8 described lateron, thereby forming two hydraulic clutches 5,7 and, respectively, 6,8.

The output shaft 2 is coupled at its outer end to the unit to be driven, for example a gearbox, rear axle gear or the like. The shaft 2, at its end located in the casing 4, supports by splines 9 a sun wheel 10 in a double planet gear train located in the casing and described below. A tubular shaft 11 is mounted freely rotatably in the casing 4 about the output shaft 2 and supports at its end located in the casing a planet carrier 12 of the double planet gear train, which carrier is mounted by a support shaft 13 at the opposite side of the casing 4. That end of the tubular shaft 11 which projects out of the casing 4 engages with a ratchet wheel 14, which can be stopped by means of a locking device 15 whereby the rotation of the tubular shaft 11 and of the planet carrier 12 is locked.

The double planet gear train consists of a forward and a reverse gear train. The forward train includes a planet gear 16, which meshes with the sun wheel 10 and is mounted on an intermediate shaft 17, on which also an intermediate planet gear 18 is mounted which meshes with the ring pinion 19. The ring pinion 19 is fastened to a traction wheel 20, which at its outer end carries the blades of one turbine wheel 7 in the hydraulic clutch 5,7 described above. The traction wheel 20 also carries one half of an auxiliary friction clutch 21, the other half of which is carried by that portion of the casing 4 which is located adjacent the traction wheel 20.

The reverse planet gear train includes a planet gear (not visible) which meshes with the sun wheel 10 common to the two planet gear trains and is mounted on an intermediate shaft 22, on which also an intermediate planet gear 23 is fastened which meshes with the ring pinion 25 via a reverse gear 24 inserted between the planet gear 23 and the ring pinion 25. The ring pinion 25 is fastened on a traction wheel 26, which at its outer end carries the blades of the second turbine 8 in the second hydraulic clutch 6,8 described above. The traction wheel 26 supports also at its outer end one half of an auxiliary friction clutch 27, the other half of which is carried by that portion of the casing 4 which is located adjacent the traction wheel 26.

The two planet gear trains, as appears from the above description, have a sun wheel 10 and a planet carrier 12 in common, thereby rendering it possible for the gearbox to operate both for speed reduction and direct drive.

The hydraulic clutches 5,7 and, respectively, 6,7 as well as the friction clutches 21,27 can be connected and disconnected at option by control means known per se.

The gearbox described operates as follows: At start for forward driving with reduced speed, the input shaft 1 and casing 4 rotate. The planet carrier 12 is locked via the shaft 11 and locking means 14,15. Oil is supplied to the hydraulic forward clutch 5,7 while the hydraulic reverse clutch 6,8 and the friction clutches 21,27 are disengaged. The planet gears 16,18 are rotated via the clutch 5,7 and traction wheel 20 and thereby drive the sun wheel 10 and the output shaft 2 with the desired reduced speed.

When after start with reduced speed one desires to change to direct drive, after a sufficient speed has been achieved, the ratchets 14,15 are released so that the planet carrier is released, and at the same time the two planet gear trains, by means of the hydraulic clutches 5, 7 and 6, 8, are coupled to the input shaft 1 over the casing 4. The input shaft 1, casing 4, the traction wheels 20,26 coupled to the casing by the clutches 5,7 and, respectively, 6,8, and the ring pinions 19, 25 of said traction wheels rotate. The forward gear train and reverse gear train thereby counteract each other so that the planet carrier cannot rotate about the sun wheel 10, but the sun wheel is taken along in the rotation of the planet carrier which has the speed of the input shaft 1. By this arrangement, thus, the input shaft 1 and the output shaft 2 rotate at the same speed. At light-duty operation it is sufficient to apply only hydraulic clutches 5,7 and, respectively, 6,8. For heavy-duty operation, however, the friction clutches 21, 27 are provided, which at the change from operation with reduced speed to operation with direct drive are coupled and at the same time the ratchets 14,15 of the planet carrier are released so that the traction wheels 20,26 are locked directly to the rotating casing 4.

Reversing with reduced speed takes place in a similar way such that oil instead is supplied to the hydraulic reverse clutch 6,8 while the hydraulic forward clutch 5,7 and the friction clutches 21,27 are disengaged. The ring pinion 25 and planet gear 22 are rotated via the hydraulic reverse clutch 6,8 and drive the sun wheel 10 whereby the rotation direction is changed by the reverse gear 24 inserted between the ring pinion 25 and planet gear 22.

The gearbox can be used also for braking by means of the reverse gear train, for example at vehicles running steeply downhill. The hydraulic clutch 5,7 is then disengaged, i.e., without oil, while the hydraulic clutch 6,8 is engaged and brakes with reduced speed over the reverse planet gear train 22, 24. The friction clutches 21,27 are disengaged.

Figure 2:
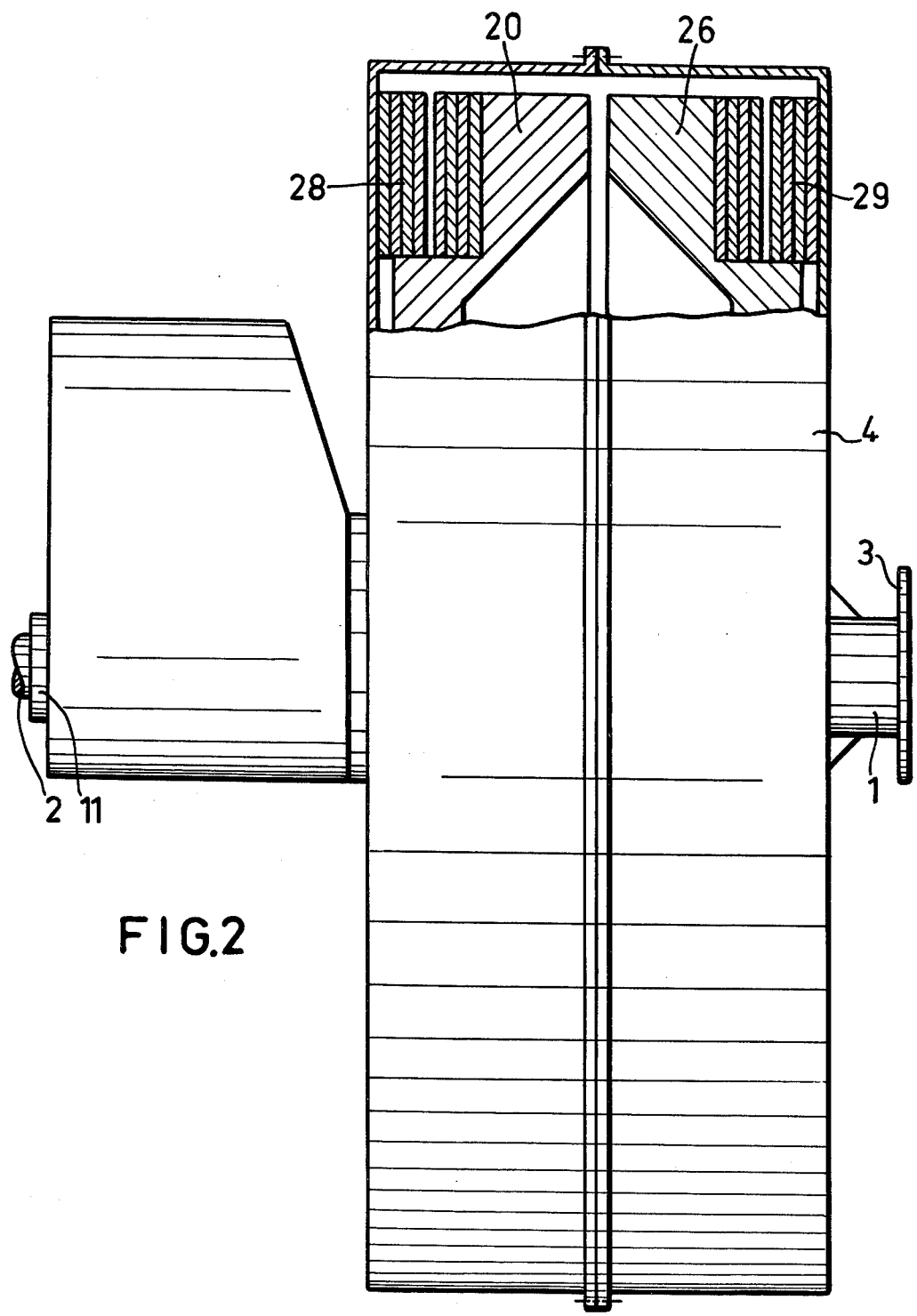
FIG. 2 shows a partially cut view of a second embodiment.

The embodiment shown in FIG. 2 resembles the embodiment shown in FIG. 1 and described above, with the difference, that the hydraulic clutches and the auxiliary friction clutches 21,27 are exchanged against two disc clutches. The details common to both embodiments are given the same reference numerals.

The clutch halves in the two disc clutches 28 and, respectively, 29 are fastened in the traction wheels 20 and, respectively, 26 for the two planet gear trains and in those portions of the opposed side surfaces of the casing 4 which are located adjacent the outer ends of the traction wheels. The embodiment shown in FIG. 2 has the same function as the embodiment shown in FIG. 1.

The clutches 5,7 and, respectively, 6,8 and 28 and, respectively, 29 described in the different embodiments replace the usual clutch means. This implies that by a housing exceeding in size only slightly the usual clutch housing both the clutching function and the function of a supplementary gearbox with reduced speed and direct drive are obtained.

The gearbox described can be applied alone or in connection to other gearboxes, such as planetary gear boxes, mechanical gear-boxes, cardans with gears etc.

What I claim is:

1. A gearbox with clutch, comprising, in combination:
   a. an input shaft;
   b. an output shaft; and
   c. a gear shifting unit arranged between the input shaft and output shaft, the unit comprising:
      i. a double planet gear train including a reverse planet gear and a forward planet gear;
      ii. a sun wheel common to the reverse and forward planet gear and mounted on the output shaft, the planet gears arranged operating on the sun wheel;
      iii. two clutches connected to the input shaft, and one connected to the forward planet gear and the other to the reverse planet gear;
      iv. a planet carrier common to the planet gears and adapted for being locked by a ratchet means; and
      v. ring pinions connected to the clutches and arranged engaging the planet gears for connecting the latter to their associated clutches, whereby the planet gears are connected to the input shaft by the clutches being engaged as desired.

2. A gearbox as defined in claim 1, characterized in that the input shaft and the output shaft are coaxial, and the input shaft is fastened on a casing, which surrounds the double planet gear train and carries on its inside one clutch half of the two clutches, the other halves of which clutches are connected to the two planet gears.

3. A gearbox as defined in claim 2, characterized in that the common planet carrier supports planet gears on both sides of the sun wheel and is mounted in the casing at one end by means of a support shaft and at the other end by means of a tubular shaft projecting out of the casing, which tubular shaft encloses the output shaft and coacts at the other end with the ratchet means of the planet carrier.

4. A gearbox as defined in claim 3, characterized in that the ring pinions of the planet gears are fastened on traction wheels, which traction wheels are rotatably mounted within the casing and carry at their outer ends the other clutch half of the two clutches.

5. A gearbox as defined in claim 4, characterized in that the clutches are mechanical brake band or disc clutches.

6. A gearbox as defined in claim 4, characterized in that the clutches are hydraulic clutches.

7. A gearbox as defined in claim 4, characterized in that the clutches are a combination of hydraulic and mechanical clutches.

* * * * *